Oct. 30, 1962
A. N. WELLS
3,060,793
APPARATUS FOR DETERMINING ELLIPTICITY OF SURFACE
REFLECTED PLANE POLARIZED LIGHT
Filed July 22, 1960
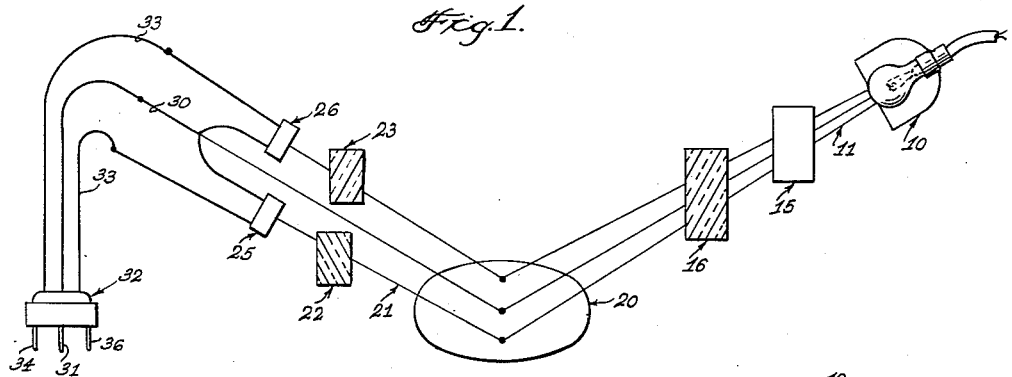
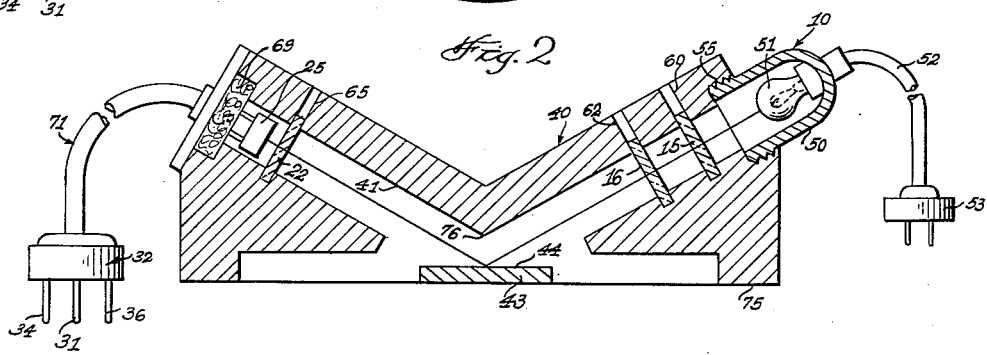
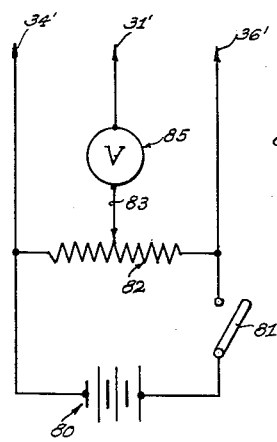
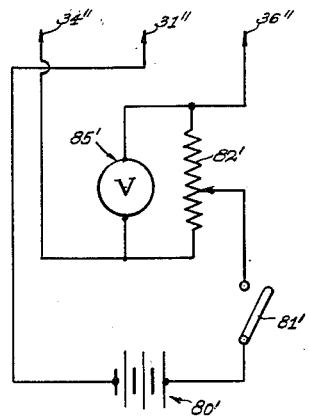
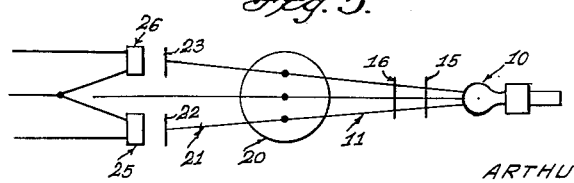
INVENTOR
ARTHUR N. WELLS
BY *Shoemaker and Mattare*
ATTORNEY

United States Patent Office 3,060,793
Patented Oct. 30, 1962

3,060,793
APPARATUS FOR DETERMINING ELLIPTICITY OF SURFACE REFLECTED PLANE POLARIZED LIGHT
Arthur N. Wells, P.O. Box 696, Belmont, Calif.
Filed July 22, 1960, Ser. No. 44,747
4 Claims. (Cl. 88—14)

The present invention relates to apparatus for determining the ellipticity of surface reflected plane polarized light, and more particularly to apparatus for analyzing the structures of various surfaces.

The principal purpose of the present invention is to analyze and determine the nature of the surface structure of various materials. These materials are adapted to be placed on a suitable supporting area or surface such that a plane polarized light beam falls thereon. The reflected light will in turn have a polarization with a certain degree of ellipticity, the ellipticity being a function of the structure of the surface, as is well understood in the art.

For example, in the case of minerals, metals, plastics and paints or the like, a quick comparative method is provided for judging the surface structures of such materials by means of determining the ellipticity of polarized light reflections.

Another important use of the invention is in providing a quick comparative means for judging the quantity of gas absorbed by the surface film of a liquid. It has been established that a correlation exists between the gas absorption of a liquid film and the tendency for polarized light reflections from such films to become elliptically dispersed.

Accordingly, by measuring the degree of ellipticity, an indication of the characteristics to be determined will be obtained.

In addition, the apparatus of the present invention may be effectively employed for obtaining a comparative determination of the structure of fibrous products such as paper and textiles, such determinations being performed on a relatively large surface area, by determining the ellipticity of reflected polarized light.

It will accordingly be apparent that the present invention may be employed in many applications such as for determining the rancidity of vegetable oils, the weathering of paint, and many other surface phenomena. These surface characteristics may be readily detected or predicted when utilizing the apparatus and method of the present invention.

The validity of obtaining the desired results by means of polarized light measurements is well established in the optical art, but the methods and apparatus heretofore in use have been excessively time consuming, and the apparatus is difficult to operate, and further there are few people who are qualified or specialized in this field to manipulate the apparatus or to perform the methods previously employed for these purposes.

In common methods now in use, the light source is polarized at approximately 45° from horizontal, said light being directed slightly downwardly toward the test surface, and the plane polarized light reflected from the test surface is analyzed for ellipticity by precisely measuring the intensity of the horizontally plane polarized light. The ratio of the latter to the former intensity is the percent ellipticity, subject to corrections for the optical equipment and electronic equipment used in such measurements.

In the present invention, neither the horizontal nor the vertical polarized component is separately measured, nor is the light intensity itself of any major consequence. In the present invention, the reflected plane polarized light passes through a pair of analyzer means which have their planes of polarization disposed substantially normally to one another. The plane of polarization with respect to horizontal of one of the analyzers is disposed substantially normally to the plane of polarization with respect to horizontal of the polarizing means which produces the polarized light which is reflected from the test surface.

A photoconductive cell is disposed adjacent each of the analyzers which receive the reflected light from the test surface, and the light passing through these last-mentioned members varies the resistance of the photocells. The photocells have substantially linear characteristics whereby the resistance thereof varies proportional to the change in light intensity. The photocells are connected in an electrical network including a bridge circuit and a volt meter, the volt meter providing readings which indicate the relative voltages of the two photocells thereby indicating the degree of ellipticity of the reflected polarized light.

An object of the present invention is to provide a new and novel apparatus for judging the surface structure of minerals, metals, plastics, paints and the like.

Another object of the invention is to provide an apparatus for quickly judging the quantity of gas absorbed by the surface film of a liquid.

A further object of the invention is the provision of an apparatus for determining the surface structure of fibrous products.

Still another object of the invention is to provide an apparatus for determining the rancidity of vegetable oils and the weathering of paint.

Yet another object of the invention is to provide apparatus for determining the ellipticity of surface reflected plane polarized light which can be operated substantially automatically and in a short period of time without any special skill on the part of an operator.

A still further object of the invention is to provide an apparatus for determining the ellipticity of surface reflected plane polarized light which is quite simple, compact and inexpensive in construction, and yet which is efficient and reliable in operation.

Other objects and many attendant advantages of the invention will become more apparent when considered in connection with the specification and accompanying drawing wherein FIG. 1 is a schematic illustration of one embodiment of the invention;

FIG. 2 is a longitudinal sectional view of a portion of the apparatus;

FIG. 3 is a schematic view of an electrical network for use with the apparatus shown in FIG. 2;

FIG. 4 is a schematic view of a modified electrical network; and

FIG. 5 is a further schematic illustration of the embodiment of the invention shown in FIG. 1.

Referring now to the drawing wherein like reference characters designate corresponding parts throughout the several views, reference is first made to FIGS. 1 and 5 which schematically illustrate the present invention. In these figures the source of light is indicated generally by reference numeral 10 and may comprise a conventional source of light such as a light bulb or the like. The light beam indicated generally by reference numeral 11 may first pass through a color filter indicated generally by the reference numeral 15. Some surfaces provide different results with different colors, and accordingly color filters may be employed with such surfaces for obtaining uniform results in such instances.

The light beam from source 10 is directed through a first polarizing means indicated generally by reference numeral 16 which may comprise a film or the like sold under the trademark "Polaroid," polarizing means 16 having a predetermined plane of polarization which is so disposed as to polarize the light at approximately 45° with respect to horizontal. The plane of polarization is indicated schematically by the direction of the shade lines shown in the drawing.

The reflecting surface is indicated generally by reference numeral 20 and may comprise any suitable surface, the characteristics of which it is desired to determine, the surface being supported in a substantially horizontal position. The light beam reflects from the surface 20 and the reflected portions of the light beam are indicated generally by reference numeral 21. It will be noted that a first portion of the reflected light beam passes through a first analyzer 22 and a second portion of the reflected light beam passes through a second analyzer 23. Each of analyzers 22 and 23 are formed of a material similar to that of polarizer 16. The planes of polarization of members 22 and 23 have a particular critical relationship to the axis of polarization of member 16.

The plane of polarization of analyzer 22 is disposed at substantially 45° with respect to horizontal, but is disposed substantially normally with respect to horizontal as compared to the plane of polarization of member 16 with respect to horizontal. In other words, the planes of polarization of the first polarizing means 16 and the analyzer 22 are substantially perpendicular to one another.

The second analyzer 23 has a plane of polarization which may be disposed approximately 45° with respect to horizontal, and with reference to horizontal, is disposed substantially parallel with the plane of polarization of member 16.

As will be well understood to one skilled in the art, a light beam passing through the first polarizing means 16 becomes plane polarized. If when the plane polarized light is reflected, there is no degree of ellipticity imparted thereto, all of the plane polarized light will be accepted by analyzer 23 and all of the plane polarized light will be rejected by analyzer 22 due to the relative disposition of the planes of polarization of the various members.

On the other hand, if a certain degree of ellipticity in the polarization is present, some of the light will pass through analyzer 22 and some of the light will pass through analyzer 23. The difference in intensity of the light passing through the two members 22 and 23 provides an indication of the degree of ellipticity which is present in the reflected plane polarized light.

In order to obtain an effective and quick measurement of the degree of intensity of light passing through members 22 and 23, photoconductive cells 25 and 26 are associated closely adjacent members 22 and 23 respectively in such a position as to receive the light passing therethrough whereby the light passing through members 22 and 23 will produce a certain degree of resistance in the photocells in a well-known manner. As the intensity of light varies, the resistance of the photocells will correspondingly be varied.

Each of the photocells has a common connection with a lead 30 which is in turn connected with one of the prongs 31 of a conventional three prong electrical plug indicated by reference numeral 32. Photocell 26 is also connected with an electrical lead 33 which is in turn connected with another prong 34 of the plug. Photocell 25 is also connected to an electrical lead 35 which is in turn connected with a third prong 36 of the plug.

Referring now to FIG. 2 of the drawing, the details of construction of the above described portion of the apparatus will be more clearly understood. A body means indicated by reference numeral 40 is provided and is adapted to normally rest upon a horizontal support surface. Body means 40 includes a pair of drilled passages 41 and 42 which intersect one another at the central portion of the body means. A suitable support member 43 is provided having an upper surface 44 upon which a suitable material, the surface of which it is adapted to analyze may be supported. If desired, the material itself may be substituted for support member 43, it being kept in mind that the upper surface of the material should be disposed in a proper relationship so as to direct the reflected light from passage 42 into passage 41.

The angle with respect to horizontal at which passages 41 and 42 extend may vary in a range of approximately 5° to 50°, although an inclination of approximately 30° is considered preferable.

The source of light 10 includes a dome shaped housing 50 having an electric light bulb 51 mounted therein which is in turn connected to an electrical cable 52 having a conventional electrical plug 53 at the outer end thereof for connection with a suitable source of electrical power for illuminating bulb 51.

The inner end portion of dome shaped housing 50 is provided with screw threads 55 which cooperate with complementary screw threads formed in a countersunk portion at the end of passage 42. In this manner, the source of the light beam is supported by the body means 40 at one end of the passage 42.

A slot 60 is provided into which is slidably fitted a suitable color filter when necessary, the color filter spanning the entire passage such that all the light passes through the color filter.

A second slot 62 is provided in the body means, and a film 16 or the like is slidably positioned within slot 62, the element 16 spanning the passage such that all the light passages through the element, the plane of polarization of the element being as aforedescribed to produce plane polarization of the light beam at approximately 45° with respect to horizontal.

A pair of slots 65 only one of which is visible in FIG. 2 is provided, and elements 22 and 23 are slidably received in slots 65, only element 22 being visible in FIG. 2. The planes of polarization of members 22 and 23 are disposed as aforedescribed.

The photocells 25 and 26, only one of which is visible in FIG. 2 are retained in place by a suitable stuffing 69 which is in turn sealed by a cover plate 70 suitably secured to the end portion of body means 40. An electrical cable 71 is connected with and supported from the central portion of cover plate 70.

The cable 71 contains the electrical leads 30, 33 and 35 aforedescribed and the plug 32 is connected to the outer end of the cable.

Body means 40 is also provided with a rim 75 which is adapted to rest flat on a horizontal supporting surface to prevent any outside light from entering the apparatus. Rim 75 is also designed to provide the correct height of the body means 40 in relation to the height of the test surface 44. It will also be noted that the lowermost portion 76 of the body means is so positioned that it prevents any direct unreflected light from passing from polarizing means 16 directly to the analyzers 22 and 23.

Referring now to FIG. 3, an electrical network for use with the apparatus defined in connection with FIGS. 1, 2 and 5 is illustrated. Reference numerals 34', 31' and 36' indicate schematically suitable electrical connectors which are adapted to cooperate with prongs 34, 31 and 36 respectively of plug 32 whereby the plug may be connected into the electrical network.

The network includes a battery 80 connected through a switch 81 to connectors 34' and 36'. A potentiometer including resistance 82 and a movable arm 83 is also connected across the battery. Movable arm 83 of the potentiometer is connected to one terminal of a conventional voltmeter 85, the other terminal of which is connected to the connector 31' and which is the common connection to both of the photocells.

It is evident that the changes in resistance of the photocells may be effectively measured by the network illustrated in FIG. 3, and the changes in resistance will be proportional to the ellipticity effect of the polarized light, and accordingly readings may be obtained indicating the degree of ellipticity.

FIG. 4 illustrates a modified form of an electrical network for use with the apparatus shown in FIG. 2, and in this case reference numerals 34", 31" and 36" illustrate schematically connectors which are adapted to receive the prongs 34, 31 and 36 respectively of the electrical plug 32. The remaining portions of the network shown in FIG. 4 are similar to those shown in FIG. 3, and have been given the same reference numeral primed. It will be noted that in this case, the movable area of the potentiometer is connected directly to one side of the battery while the other side of the battery is connected to the common connector 31", and the voltmeter 85' as well as resistor 82' of the potentiometer are connected across terminals 34" and 36". It is evident that the latter electrical network may also be readily employed for measuring the difference in resistance of the two photocells thereby giving an indication of the degree of ellipticity present in the effected portions of the polarized light.

It is evident that in operation, the meters or measuring means of the electrical networks may be calibrated by placing a member having known surface characteristics in position to reflect the polarized light in the apparatus, whereupon the potentiometer of the bridge circuit may be adjusted to provide a suitable reading. Any subsequent readings obtained will be comparative readings, and accordingly the degree of ellipticity may be accurately determined.

It is apparent from the foregoing that there is provided a new and novel apparatus for quickly judging the surface structures of minerals, metals, plastics, paints and the like. In addition, the quantity of gas absorbed by the surface films of liquids may be quickly determined. Furthermore, a comparative determination of the structure of fibrous products may be effectively obtained, and the rancidity of vegetable oils, the weathering of paint and other surface phenomena may be readily detected or predicted. The operation may be carried out substantially automatically since it is merely necessary to energize the source of light whereupon closing of the switch of the measuring network will provide a reading on the meter. It is evident that no special skill is required in operating the apparatus of the present invention. Furthermore, the apparatus is quite simple, compact and inexpensive in construction, yet is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. Apparatus for determining the ellipticity of surface reflected plane polarized light comprising a source of light for generating a light beam, a polarizing means disposed in the path of the light beam generated by said light source, a first analyzer disposed in the path of light from said light source after it is reflected from a surface to be tested and having a plane of polarization substantially perpendicular with respect to the plane of polarization of said polarizing means, and a second analyzer disposed in the path of light reflected from a surface to be analyzed and having a plane of polarization substantially parallel with respect to the plane of polarization of said polarizing means, and common measuring means including photocell means disposed adjacent said analyzers and remote from the reflective surface for receiving light passing through said analyzers for measuring the difference of intensity of light passing through said analyzers, whereby the difference in intensity of the light passing through the analyzers provides an indication of the degree of ellipticity which is present in the reflected light.

2. Apparatus for determining the ellipticity of surface reflected plane polarized light comprising a body means, a source of light supported by said body means, a polarizing means supported by said body means in a position to pass the light beam generated by said light source, said body means including a support area upon which a surface to be analyzed is adapted to be supported, a first analyzer supported by said body means in a position to pass the light reflected from a surface supported on said support area, said analyzer having a plane of polarization substantially perpendicular with respect to the plane of polarization of said polarizing means, a second analyzer supported by said body means in a position to pass the light reflected from a surface supported on said support area and having a plane of polarization substantially parallel with respect to the plane of polarization of said polarizing means, first and second photocells supported by said body means, a first one of said photocells being disposed closely adjacent said first analyzer remote from said support area for receiving light passed through said first analyzer, and a second one of said photocells being disposed adjacent said second analyzer remote from said support area for receiving light passing through said second analyzer, and means for connecting said photocells in an electrical measuring network, whereby the difference in intensity of the light passing through the analyzers provides an indication of the degree of ellipticity which is present in the reflected light.

3. Apparatus for determining the ellipticity of surface reflected plane polarized light comprising a source of light, a polarizing means disposed in such a position as to pass the light beam from said light source and having a predetermined plane of polarization with respect to horizontal, a first analyzer disposed in a position to receive a portion of the light beam reflected from a surface to be analyzed and having a plane of polarization substantially perpendicular with respect to the plane of polarization of said polarizing means, a second analyzer disposed in such a position to receive another portion of the light beam reflected from a surface to be analyzed, said second analyzer having a plane of polarization substantially parallel with respect to the plane of polarization of said polarizing means, a first and second photocell disposed adjacent said analyzers and disposed in such a position as to receive the reflected portion of the light beam passing through the analyzers, and an electrical measuring network connected to said photocells for measuring the difference in impedance of the photocells, whereby the difference in intensity of the light passing through the analyzers provides an indication of the degree of ellipticity which is present in the reflected light.

4. Apparatus as defined in claim 3 wherein said electrical measuring network includes a bridge circuit having a voltmeter connected therewith.

References Cited in the file of this patent
UNITED STATES PATENTS

| | | |
|---|---|---|
| 2,457,799 | Altenberg | Jan. 4, 1949 |
| 2,583,186 | Mueller | Jan. 22, 1952 |
| 2,829,555 | Keston | Apr. 8, 1958 |